April 14, 1953 C. H. JORGENSEN ET AL 2,634,715
ENGINE CONTROLLER
Filed Jan. 25, 1947 6 Sheets-Sheet 4
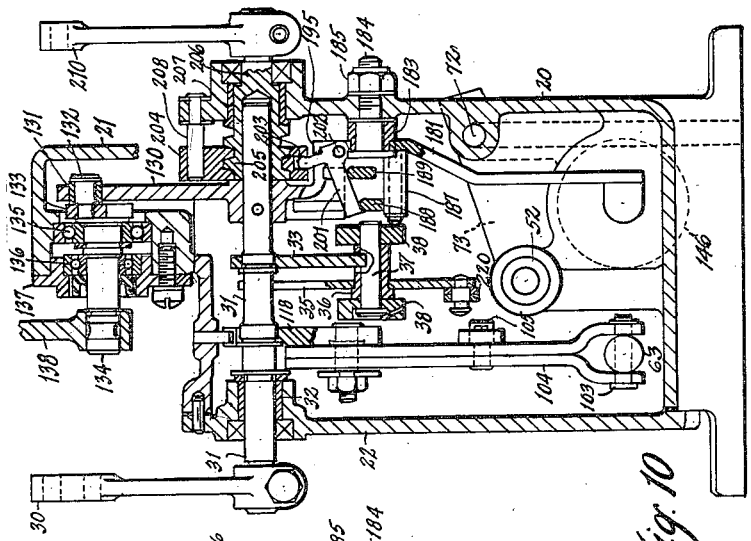
INVENTORS
Clarence H. Jorgensen
and
Willard T. Nickel
by
Spencer Hardman & Fehr
their attorneys April 14, 1953 C. H. JORGENSEN ET AL 2,634,715
ENGINE CONTROLLER
Filed Jan. 25, 1947 6 Sheets-Sheet 5

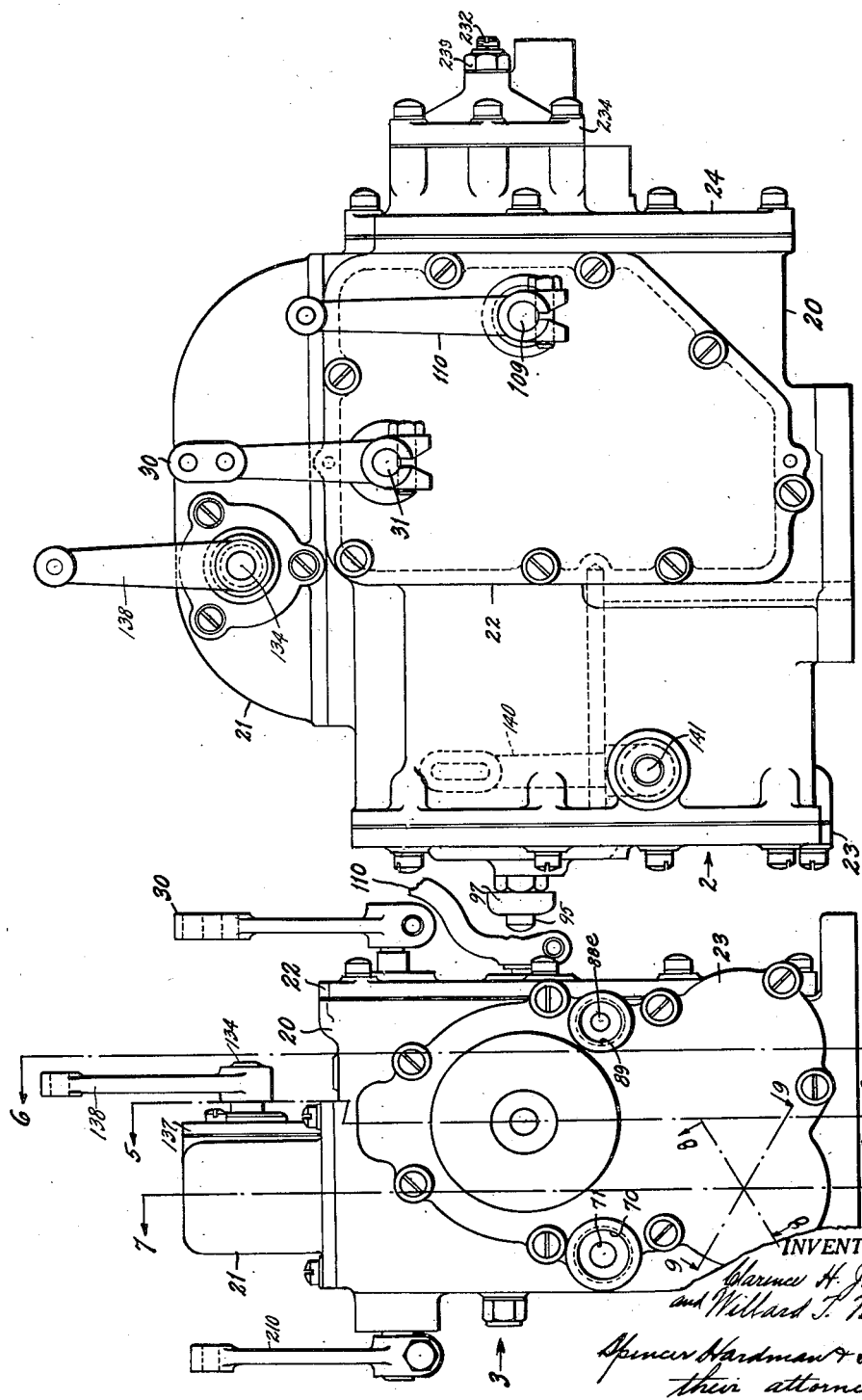

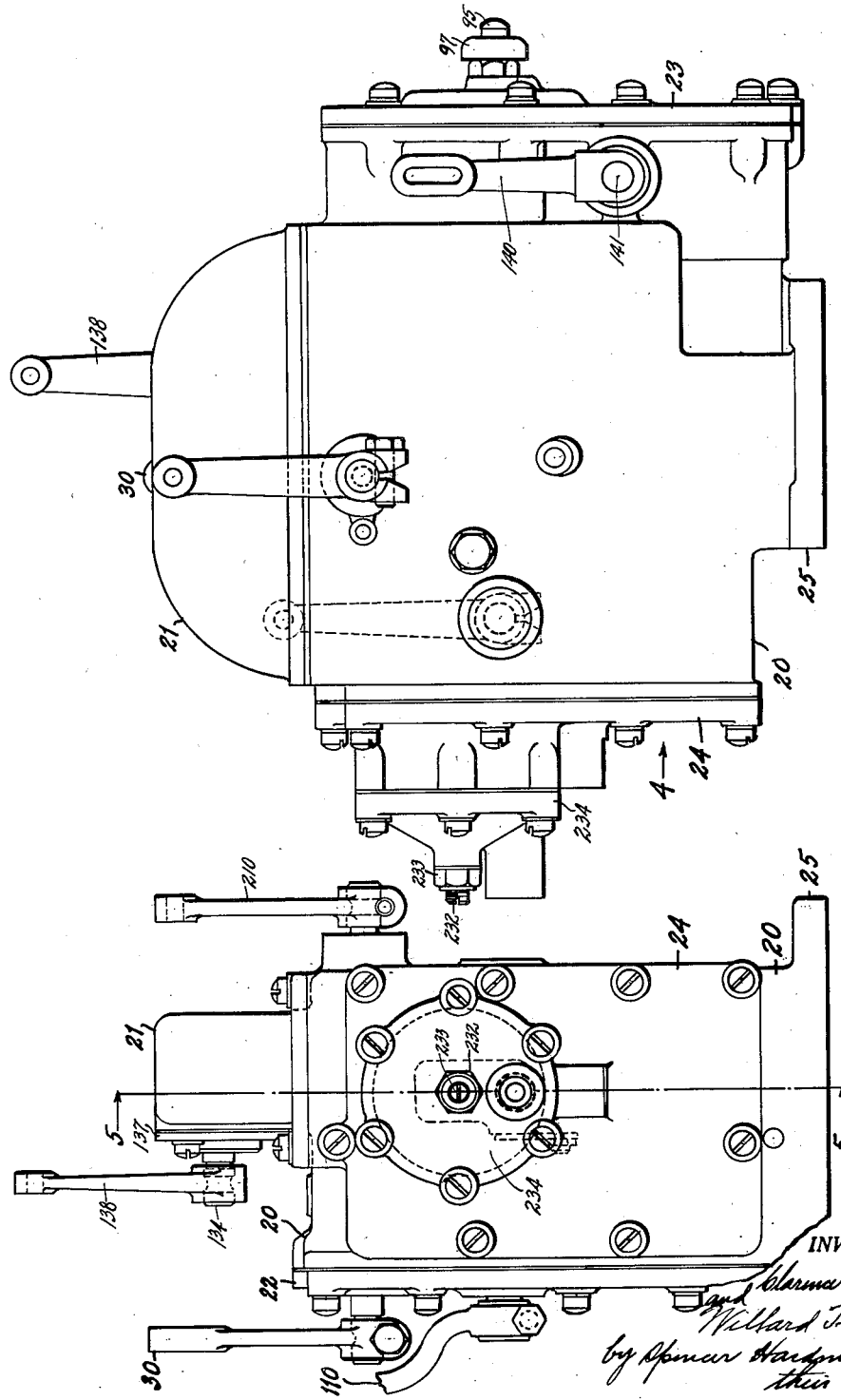

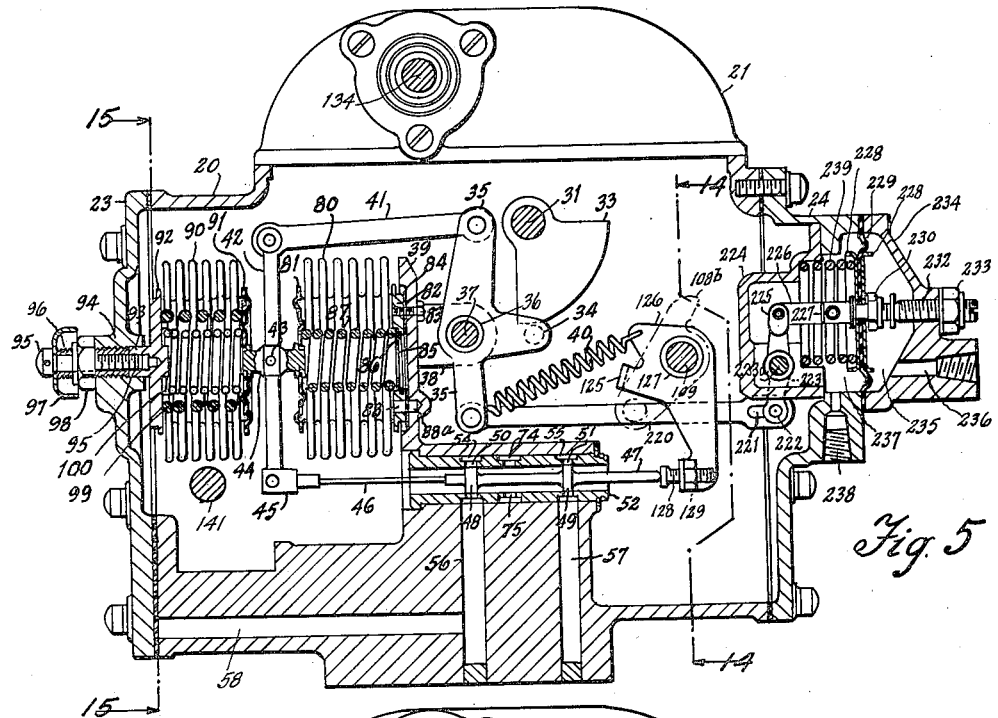

INVENTORS
Clarence H. Jorgensen
and
Willard T. Nickel
by Spencer Hardman & Fehr
their attorneys

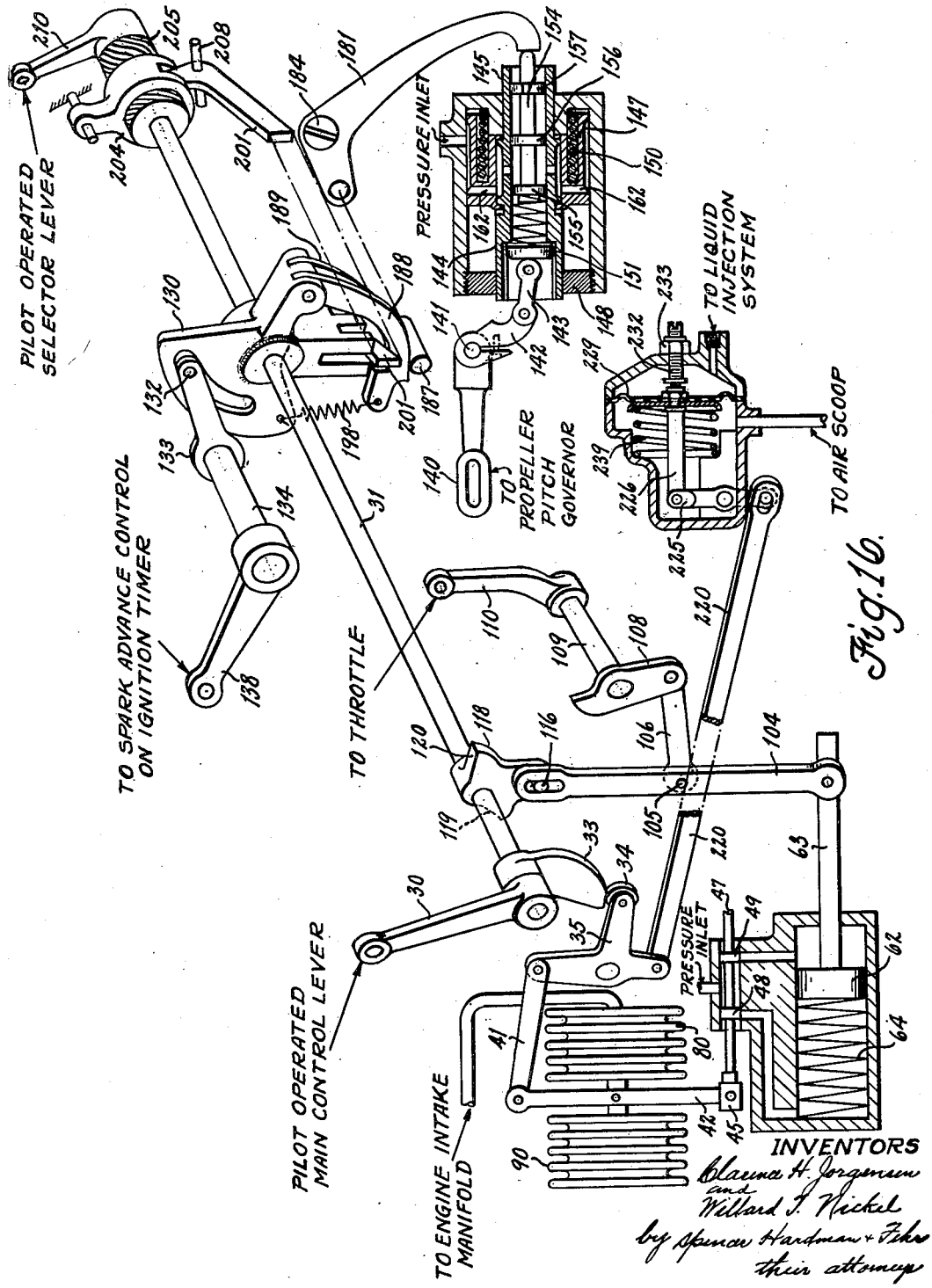

Patented Apr. 14, 1953

2,634,715

UNITED STATES PATENT OFFICE 2,634,715

ENGINE CONTROLLER

Clarence H. Jorgensen, East Rochester, and Willard T. Nickel, Rochester, N. Y., assignors to General Motors Corporation, Detroit, Mich., a corporation of Delaware Application January 25, 1947, Serial No. 724,428

19 Claims. (Cl. 123—103)

1

This invention relates to control devices for aircraft engines and particularly to control devices having means for controlling the engine intake pressure and speed according to some predetermined schedule.

The principal object of the present invention is to provide a control device of this character in which means are included to control the engine speed in relation to engine intake pressure according to a plurality of different schedules.

An additional object of the invention is to provide means for supplying an anti-detonant to the engine so as to enable higher intake pressures to be maintained than would normally permit safe engine operation and to provide novel and improved means for limiting the intake pressure which is obtainable when the anti-detonant is not being supplied to a value which is not high enough to be unsafe or to cause possible damage to the engine.

In the disclosed embodiment of the invention these objects are attained by the provision of a plurality of speed control cams either one of which may cooperate with a pressure selecting cam in determining the schedule of speed and pressure which is maintained and means to selectively determine which of the speed control cams shall cooperate with the pressure selecting cam in determining the speed and pressure schedule. Also, means are provided operable in cooperation with the means for supplying anti-detonant which prevents engagement of a cam follower with the pressure selecting cam to select pressures high enough to cause engine damage when anti-detonant is not being introduced regardless of the position of the pressure selecting cam, unless the means for supplying the anti-detonant is operating.

Further objects and advantages of the present invention will be apparent from the following description, reference being had to the accompanying drawings, wherein a preferred embodiment of the present invention is clearly shown.

In the drawings:

Fig. 1 is a side view of a controller embodying the present invention.

Fig. 2 is an end view looking in the direction of arrow 2 of Fig. 1.

Fig. 3 is a side view looking in the direction of arrow 3 of Fig. 2.

Fig. 4 is an end view in the direction of arrow 4 of Fig. 3.

Fig. 5 is a sectional view on line 5—5 of Figs. 2 and 4.

Fig. 6 is a sectional view on the line 6—6 of Fig. 2.

2

Figures 13, 14, 15:
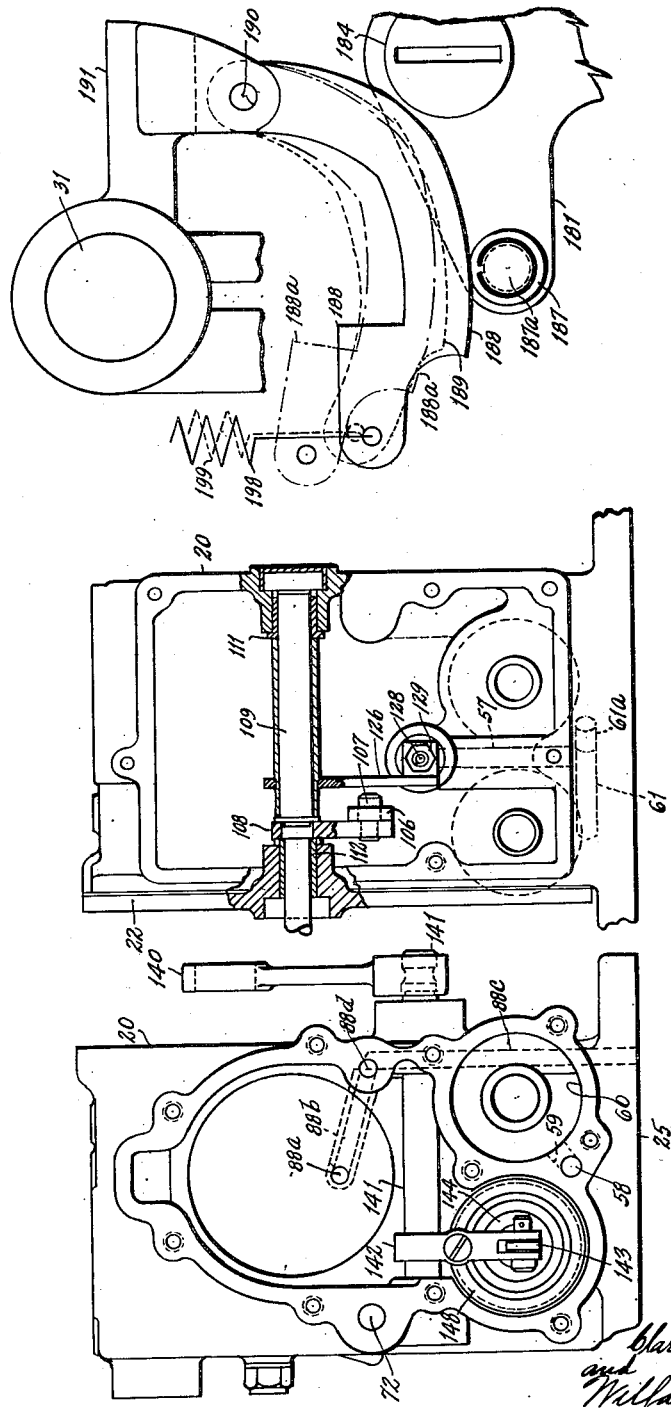

Fig. 7 is a sectional view on the line 7—7 of Fig. 2.

Figs. 8 and 9 are fragmentary sectional views showing some of the parts shown in Fig. 7, said sections being on lines 8—8 and 9—9, respectively, of Fig. 2.

Fig. 10 is a sectional view on the line 10—10 and 10a—10a of Fig. 7.

Fig. 11 is a fragmentary side view in the direction of arrow 11 of Fig. 7.

Fig. 12 is a fragmentary side view in the direction of arrow 12 of Fig. 7, certain parts being shown in section.

Fig. 13 is a view showing a portion of the mechanism shown in Fig. 7, particularly the cams which determine the speed control according to two different schedules.

Fig. 14 is a sectional view on the line 14—14 of Fig. 5.

Fig. 15 is an end view of the housing of the controller with certain parts being removed, this view being in the plane of line 15—15 of Fig. 5.

Fig. 16 is a diagrammatic view of the control mechanism.

Referring to Figs. 1 to 4, the controller housing comprises a case 20 having top, side and end openings closed by cover plates 21, 22, 23 and 24, respectively. Case 20 provides a base 25 by which the controller is mounted on a stationary part such as a pad provided by the engine.

Referring to Fig. 10, a main control lever 30 is fixed to a shaft 31 journaled in a bearing 32 provided by cover plate 22. Shaft 31 moves a pressure-selecting cam 33 which is shown in Fig. 5 engaged by follower 34 carried by lever 35, fixed to a hub 36 (Fig. 10) journaled on a rod 37 supported by brackets 38 extending from partition 39 of the case 20. A spring 40 urges the lever 35 counterclockwise as shown in Fig. 5. Lever 35 is connected by a link 41 with a floating lever 42 pivoted on a pin 43 carried by a bridge 44. Lever 42 is pivotally connected with a clevis 45 connected by wire rod 46 with a valve 47 having lands 48 and 49 for controlling pressure oil distribution ports 50 and 51, respectively, of a valve guide 52, said ports being connected respectively with annular grooves 54 and 55 communicating respectively with passages 56 and 57. Passage 56 is connected by passages 58 and 59 with the left end of cylinder 60 (Figs. 6 and 15) and passage 57 is connected by a passage 61 with the right end of the cylinder 60 (Fig. 14). Cylinder 60 contains a piston 62 attached to a rod 63 and urged right by a spring 64. Oil from a pressure source, such as is provided by the engine, is supplied by a pipe (not shown) connected by a suitable fitting with the threaded opening 70 in cover 23 (Fig. 2). Oil enters through the hole in cover 23 and flows through a passage 72 (Figs. 7 and 10) connected by a passage 73 with annular groove 74 of the valve guide 52, said groove being connected by holes 75 with the space surrounding the valve 47 between its lands 48 and 49.

The distribution of the pressure fluid to the servo motor cylinder 60 is under control by the pressure selecting cam 33 and by means responsive to the engine intake pressure. This means includes metal bellows 80 and 90 having end members 81 and 91, respectively, which support the bridge 44. The right end of the bellows 80 is attached to a ring 82 secured by screws 83 to the partition 39 with a gasket 84 between. Ring 82 receives a split ring 85 which retains a ring 86. A spring 87 is retained under compression between the ring 86 and the end plate 81. Extending through ring 82 is a hole 88 which registers with a corresponding hole in the gasket and a recess 88a in partition 39, the recess 88a being connected, as shown in Fig. 6, with a side passage 88b which, as shown in Fig. 15, is connected with passages 88c and 88d. The passage 88c extends through the base 25 and the mounting pad which receives the base may have a hole therein registering with passage 88c and said hole may be connected in any suitable manner with the engine intake. Passage 88d registers with a hole 88e in cover 23 (Fig. 2) which provides a threaded recess 89 for receiving a pipe fitting by which a pipe connected with the engine intake can be connected with passages 88e, 88d and 88a. If passage 88c is used, the opening 89 is plugged; and, vice versa, if passage 88e is used, passage 88c is plugged.

Bellows 90 is fixed to a left end plate 92 having a shank 93 received by a tubular boss 94 formed on a cover 23 and having threaded engagement with a screw 95 which extends through a tubular screw 96 and retains a shield 97 in position. When screw 95 is removed, the shield 97 is removed to permit turning the screw 96 which determines the position of left plate 92 of bellows and therefore determines the initial position of pin 43. A nut 98 secures the screw 96 in the desired position of adjustment.

Bellows 90 contains springs 99 and 100. Bellows 90 is evacuated and its effective area is equal to that of bellows 80. Therefore, the position of pin 43 is unaffected by changes in atmospheric pressure surrounding the bellows 80 and 90. Springs 87, 99 and 100 are so constructed and calibrated that the relation of the positions of pin 43 corresponding to various values of engine intake pressure is substantially a linear relation.

Piston rod 63 (Figs. 6 and 10) is connected by pin 103 with a floating lever 104 connected by a pin 105, link 106 and pin 107 with a lever 108 which, as shown in Fig. 14, is fixed to a shaft 109 fixed to a throttle valve operating lever 110 (Figs. 1 and 4) connected in any suitable manner with the engine throttle valve. Shaft 109 is journaled in bearings 111 and 112 (Fig. 14) provided respectively by the case 20 and the cover 22. Lever 104 is provided with a slot 115 (Fig. 6) which receives a roller 116 pivotally supported by stud 117 carried by a lever 118 attached to shaft 31. Lever 118 is provided with surfaces 119, 120, respectively, for engaging stop screws 121 and 122 retained in adjusted position by nuts 123 and 124 which limit movement of shaft 31 by lever 30. The operation of lever 30 as it is moved to select an engine intake pressure to be maintained by the controller causes a partial opening of the throttle valve. This opening is sufficient to permit the engine to be manually controlled in order to make a safe landing, in the event of failure of the automatic mechanism for moving the throttle but is insufficient to obtain the pressure called for by the cam 33, as it is positioned by movement of lever 30. Therefore, the piston 62 of the servomotor cylinder 60 is caused to operate to effect additional throttle opening sufficient to produce and maintain the demanded pressure. The servomotor ceases operation when the valve 47 is returned to equilibrium position shown in Fig. 5 in response to the operation of means including bellows 80 which is sensitive to engine intake pressure. For example, referring to Figs. 5 and 6, when the engine throttle is in the idling position at sea level, lever 108 will be in full line position shown in Fig. 6 and when the pressure selecting cam 33 is in position to select idling pressure the levers 118 and 104 will also be in full line position and the throttle is in the idle position. If some intermediate pressure between idle and maximum, is selected the cam 33 is moved to the required position and the levers 118, 104 and 108 are all manually moved, toward the positions 118a, 104a and 108a which are shown in Fig. 6. This effects a movement of the throttle toward, but not quite to the position necessary to obtain the selected pressure, the additional movement being effected by the servomotor. The total movement of the throttle, both manual and automatic leaves the throttle at some position between the idle position and wide open at any altitude less than critical altitude. As the aircraft moves to higher altitudes the throttle is progressively opened by the action of the servomotor, in order to maintain the pressure which has been selected, until, at critical altitude it has been moved to wide open position.

It will be understood that the distance through which the throttle is moved by the servomotor to bring the throttle to wide open position at critical altitude will depend on the amount of pressure selected. For example, if a pressure of 20 inches is selected, the manual movement of the throttle, although almost enough to obtain the 20 inches, is not very great, and the extent of movement from such a position to wide open position, where it would be at critical altitude is great. On the other hand, if a high pressure is selected, for example 60 inches or more, the manual movement of the throttle is much greater and the amount of movement effected automatically by the servomotor, to bring the throttle to wide open position at critical altitude is much less.

As shown in Fig. 6, the dot and dash line 118a indicates the position to which the lever 118 is moved when the cam 30 is moved to select the maximum pressure. When moved to this position the levers 104 and 108 are moved to the positions 104a, and 108a respectively. When lever 108 is in position 108a the throttle is in a relatively wide open position, but not fully open. As the servomotor operates to move the throttle to wide open position the lever 104 is moved to the position 104b and lever 108 to position 108b. In this position of lever 108 the throttle is fully open, so obviously only a small movement of the servomotor is necessary to effect full opening of the throttle.

If a lesser pressure is selected, the levers 118 and 104 will be manually moved to a position somewhere between the solid line position and the positions 118a and 104a. In moving to this position less movement of lever 108 and less opening of the throttle will be effected manually than when the maximum pressure is selected. Obviously, to move lever 108 from such an intermediate position to the position 108b, in which the throttle is fully open, will require a greater movement of the servomotor piston 62.

It will be apparent from the foregoing, that the servomotor is effective to move the throttle to full open position at critical altitude for all selected pressures from the lowest pressure required for minimum cruise up to the maximum pressure selection possible, but that the extent of movement of the throttle by the servomotor to accomplish this result, as well as the movement of the servo piston 62 is progressively less as the pressure selections are increased.

Since the throttle is moved to full open position by a small movement of piston 62 when relatively low pressures are selected, it is necessary to stop the movement of said piston toward the left when the throttle has reached wide open position, in order to prevent movement of the throttle beyond such position. In order to stop the piston at the proper place a lever 126 is secured to a hub 127, rotatably mounted on shaft 109 and has a lug 125, which is engaged by lever 108 when it approaches the 108b, or wide open throttle, position. The lever 125 also supports an adjustable set screw secured in adjusted position by nut 129 and adapted to engage the control valve 47. As lever 108 is moved to the 108b position, the screw 128 moves the valve 47 to its neutral or equilibrium position, stopping movement of the servo piston 62 as the throttle reaches its full open position.

Lever 30 operates through shaft 31 a cam 130 (Fig. 10) whose cam slot is engaged by follower roller 131 journaled on a stud 132 attached to a lever 133 fixed to a shaft 134 journaled in a bearing 135, supported by plate 21 and in the bearing 136 supported by a plate 137 attached to cover plate 21. An arm 138 attached to shaft 134 is connected in any suitable manner with the ignition timing device not shown. Cam 130 is so related to cam 133 that the ignition timing bears a predetermined relation to the schedule of the pressure selections.

The controller provides for the control of the engine speed through changes in propeller pitch. The adjusting mechanism of the propeller pitch governor, not shown, is connected in any suitable manner with a lever 140 attached to a shaft 141 (Figs. 15 and 7). Shaft 141 is connected by a lever 142 and link 143 with a piston rod 144 which is slidable in a bearing 145 provided by the end wall of a cylinder 146 which receives a piston 147 attached to the rod 144. Rod 144 is guided also by a plug 148 having spanner-wrench holes 149. A spring 150 urges the piston 147 toward the left. A spring cup 151 bears against the link 143 and receives a spring 152 supported between said cup and a spring seat 153 provided by the end of a valve 154 slidable within the hollow piston rod 100 and having lands 155 and 156 and a notched shoulder 157 which engages a snap ring 158 when the valve is moved far enough to the right relative to the rod 144, preventing further movement of the valve. Oil passage 73 (Figs. 10 and 7) is connected with passage 160 leading into the cylinder 146 and into the space in the annular groove 161 of the piston 147. Passage 162 connects groove 161 with an annular groove 163 of rod 144 and groove 163 is connected by holes 164 with the space between the valve lands 155 and 156. As shown in Fig. 9, valve 154 controls ports 165 which are in a plane displaced 60° from the plane of holes 162 (Fig. 7). If valve 154 is moved left, pressure fluid can flow through the ports 165 into a pair of grooves 166 formed in the outer surface of piston rod 144 and thence out of holes 167 to the right side of piston 147 to cause the same to move left until it moves the ports 165 into alignment with the land 155. Thus piston 147 will follow the left movement of the valve 154. Similarly, when piston 147 is in a position to the left with respect to that shown in Fig. 7, it can be moved right. Whenever valve 154 moves right, to cause land 156 to move to the right of a pair of ports 170 opening into a pair of diametrically opposite grooves 171, also formed in the outer surface of piston rod 144 and leading into a pair of holes 172, pressure fluid is conducted to the left end of the piston 147. Piston 147 will then move right until it brings its ports 170 into alignment with the land 156. The plane of the ports 170, grooves 171 and holes 172 is displaced 60° from the planes of Figs. 7 and 9. Movement of piston 147 moves shaft 141 to change the adjustment of the propeller pitch governing mechanism and determines the pitch of the propeller blades.

The position of lever 140 which controls the setting of the propeller pitch governor is dependent on the position of the valve 154. Valve 154 is positioned by set screw 180 carried by lever 181 and secured in adjusted position by lock nut 182. Valve 154 is maintained in engagement with the screw 180 by the spring 152. Lever 181 is fixed to a hub 183 (Fig. 10) journaled on a stud 184 secured in position in the case 20 by nut 185. A spring 186 attached to lever 181 and partition 39 urges the lever 181 clockwise to bring a roller 187 into engagement with either of the two cams 188 and 189 (Fig. 13). Cam 188 which is in front of cam 189 is shown also in Fig. 7. Both cams are pivotally supported by a pin 190 carried by an arm 191 which may be and is shown as integral with the cam 130. Springs 198 and 199, connected respectively with cams 188 and 189 and with a spring stud 200 which is supported by a cam 130 (Fig. 11), tend to urge these cams 188 and 189 clockwise about their pivot 190 until they engage stop surfaces 196 and 197, respectively, provided by an arm 195 which may be integral with the arm 191 and cam 130. When cam 188 is in engagement with its stop 196 it will occupy the dot-dash line position 188a (Fig. 13) thereby permitting cam 189 to control the position of lever 181 by contact with the follower roller 187. When it is desired to cause the cam 188 to take over control of the lever 181, it is moved from position 188a to the full line position shown in Figs. 13, 7 and 10 by operation of a lever 201, which is movable to the position shown in Fig. 10, to bring this about. Lever 201 is pivoted on a pin 202 supported by arm 195. It has a part which is received by a nut 204 engaging a screw threaded portion 205 of shaft 206 which is centrally bored to provide a journal for the shaft 31 and which is journaled in a bushing 207 positioned in the case 20. Rotation of the nut 204 is prevented by providing it with a hole which receives a stud 208 carried by case 20. Shaft 206 is operated by a cam selector lever 210 which may be operated manually. Thus it is apparent that the control of engine speed in relation to pressure selection can be effected according to either of two schedules dependent upon whether cam 188 or cam 189 is effective to control the position of lever 181.

Referring to Fig. 5, lever 35 is connected with a link 220 having a slot 221 which receives a pin 222 carried by an arm 223 attached to a shaft 223a pivotally supported by a plate 224 which is attached to the cover plate 24. Shaft 223a carries an arm 225 connected by a link 226 with a stud 227 having a threaded portion which passes through washers 228 and an intermediate diaphragm 229. A nut 230 on the threaded portion of the stud 227 clamps the washers and diaphragm against a shoulder of the stud. Stud 227 is engageable with a stop screw 232 which a nut 233 fixes in adjusted position relative to a supporting cover plate 234 attached to the plate 24. The edge of the diaphragm 229 serves as a gasket between parts 234 and 24 thereby providing a chamber 235 into which a liquid such as alcohol-water mixture used for injection with the fuel to prevent detonation is admitted through a passage 236 connected in any suitable manner with the injection apparatus. An apparatus for injecting such a water and alcohol mixture is shown in the application of Dolza et al., Serial No. 550,232, and now Patent Number 2,491,484, issued December 20, 1949. The plates 24 and 224 and diaphragm 229 enclose a chamber 237 communicating with a passage 238 which a pipe, not shown, may connect with the air scoop of the airplane so that the chamber 237 will be subjected to variation in altitude-pressure.

When the apparatus for supplying the antidetonant is operating, the pressure in chamber 235 upon diaphragm 229 is sufficient to overcome the force exerted by spring 239 and the altitude-pressure in chamber 237 upon the diaphragm 229, thereby causing the shafts 223a and arms 225 and 233 to turn counterclockwise, in order that the cam follower 34 may follow the cam 33 when in position of high pressure selection. When the liquid-injection apparatus fails or the supply of liquid is exhausted, the pressure in chamber 235 diminishes to such an extent that the diaphragm is moved to the right until the stud 227 engages the screw 232. Then the pin 222 so limits right movement of the link 220 that the roller 234 cannot follow the cam 33 when it is located in the range for high pressure selection. The lever 30 however is free to control engine speed and ignition timing as before, but the intake pressure is limited to values which are safe for engine operation without detonation when liquid-injection is not being used.

Attention is called to application Ser. No. 114,438, of Dolza et al., filed September 7, 1949, a continuation of application Ser. No. 449,918, filed July 6, 1942, now abandoned; to Patents Nos. 2,491,482 and 2,491,484 of Dolza et al., both granted December 20, 1949; to Patents Nos. 2,503,274 and 2,572,865 of Jorgensen et al., granted April 11, 1950, and October 30, 1951, respectively. The foregoing application and patents are owned by the same assignee as this application and the latter is related thereto by reason of the fact that it has disclosure common with such application and patents.

While the embodiment of the present invention as herein disclosed, constitutes a preferred form, it is to be understood that other forms might be adopted, all coming within the scope of the claims which follow.

What is claimed is as follows:

1. A controller for an engine having speed governing apparatus comprising means for maintaining a selected engine intake pressure, means for selecting the intake pressure to be maintained, means for controlling the governing apparatus to maintain a selected speed, means for selecting the speed to be maintained according to one of a plurality of schedules in relation to pressure selection, means for adjusting the speed selecting means to determine the schedule of speed selection, and means for operating the pressure selector and the speed selector concurrently.

2. A controller for an engine having speed governing apparatus comprising means for maintaining a selected engine intake pressure, means for selecting the intake pressure to be maintained, means for controlling the governing apparatus to maintain a selected speed, means for selecting the speed to be maintained according to one of a plurality of schedules in relation to pressure selection, means for adjusting the speed selecting means to determine the schedule of speed selection, means for operating the pressure selector and the speed selector concurrently and means which prevents functioning of the second means to select certain high pressures unless an apparatus for preventing detonation is operating, regardless of functioning of the operating means.

3. A controller for an engine having speed governing apparatus comprising means for maintaining a selected intake pressure, means for selecting the pressure to be maintained, means for controlling the governing apparatus to maintain a selected speed, means for selecting the speed to be maintained according to one of a plurality of schedules in relation to pressure selection and including a plurality of cams any one of which effects control according to its particular schedule, means for determining which of said cams is effective to control, and means for operating the pressure selector and the speed selector concurrently.

4. A controller for an engine having speed governing apparatus comprising means for maintaining a selected intake pressure, means including a cam and cam follower for selecting the pressure to be maintained, means for controlling the governing apparatus to maintain a selected speed, means for selecting the speed to be maintained according to one of a plurality of schedules in relation to pressure selection and including a plurality of cams any one of which effects control according to its particular schedule, means for determining which of said cams is effective to control, means for operating the pressure selector and the speed selector concurrently, and means which prevents the engagement of the cam follower with the cam first mentioned to select certain high pressures unless a fuel-cooling apparatus is operating regardless of functioning of the operation means.

5. A controller for an engine having speed governing apparatus comprising means for maintaining a selected intake pressure, a main control shaft, a cam operated thereby and a cam follower operated by the cam for adjusting the first means to select the pressure to be maintained, a cam carrier operated by the shaft, a plurality of cams supported by the carrier for selecting speeds respectively according to different schedules in relation to pressure selection, a cam follower engageable with any of the cams supported by the carrier, means for determining which of the speed selecting cams engages the second mentioned follower, and means under control by the second mentioned follower for controlling the governing apparatus whereby engine speed conforms to engine intake pressure according to a selected schedule determined by the functioning cam.

6. A controller for an engine having speed governing apparatus comprising means for maintaining a selected intake pressure, a main control shaft, a cam operated thereby and a cam follower operated by the cam for adjusting the first means to select the pressure to be maintained, a cam carrier operated by the shaft, a plurality of cams supported by the carrier for selecting speeds respectively according to different schedules in relation to pressure selection, a cam follower engageable with any of the cams supported by the carrier, means for determining which of the speed selecting cams engages the second mentioned follower, means under control by the second mentioned follower for controlling the governing apparatus whereby engine speed conforms to engine intake pressure according to a selected schedule determined by the functioning cam, means for supplying an anti-detonant and means which prevents engagement of the first cam follower with the first cam to select certain high pressures regardless of operation of the control shaft unless the means for supplying an anti-detonant is operating.

7. A controller for an engine having speed governing apparatus comprising means for maintaining a selected intake pressure, a main control shaft, a cam operated thereby and a cam follower operated by the cam for adjusting the first means to select the pressure to be maintained, a cam carrier operated by the shaft, a plurality of cams supported by the carrier for selecting speeds respectively according to different schedules in relation to pressure selection, a cam follower engageable with any of the cams supported by the carrier, means for determining which of the speed selecting cams engages the second mentioned follower, said last mentioned means including a cam-contacting lever pivotally supported by the cam carrier, a member coaxial with the operating shaft and having a circumferential groove, an element received by the groove and connected with the lever, and a device for moving the member axially, and means under control by the second mentioned follower for controlling the governing apparatus whereby engine speed conforms to engine intake pressure according to a selected schedule determined by the functioning cam.

8. A controller for the engine having speed governing apparatus comprising means for maintaining a selected intake pressure, a main control shaft, a cam operated thereby and a cam follower operated by the cam for adjusting the first means to select the pressure to be maintained, a cam carrier operated by the shaft, a plurality of cams supported by the carrier for selecting speeds respectively according to different schedules in relation to pressure selection, a cam follower engageable with any of the cams supported by the carrier, means for determining which of the speed selecting cams engages the second mentioned follower, said last mentioned means including a cam-contacting lever pivotally supported by the cam carrier, a second shaft providing a screw coaxial with the first shaft, a nut received by the screw and having a circumferential groove, an element received by the groove and connected with the lever, means for turning the second shaft, means for preventing rotation of the nut whereby it moves axially when the second shaft is turned, and means under control by the second mentioned follower for controlling the governing apparatus whereby engine speed conforms to engine intake pressure according to a selected schedule determined by the functioning cam.

9. A controller for an engine having speed governing apparatus comprising, in combination, means for maintaining some selected pressure in the engine intake, means for selecting the pressure to be maintained in said intake, means for controlling the speed governing apparatus to maintain a selected speed, means for selecting the engine speed to be maintained according to any one of a plurality of schedules having different relations to the pressure selection, means for determining the particular speed selecting schedule which shall be effective and means for connecting the speed selecting means with the pressure selecting means so that said speed selecting means and pressure selecting means are operated simultaneously.

10. A controller for an engine having speed governing apparatus comprising, in combination, means for maintaining some selected pressure in the engine intake, means for selecting the pressure to be maintained in said intake, means for controlling the speed governing apparatus to maintain a selected speed, comprising a plurality of speed selecting elements which are so constructed that each of said elements is effective to maintain a different schedule of engine speed with respect to the schedule of pressure selection, means for rendering one of said elements effective to control the selected engine speed and for determining which speed selecting element shall be effective, and means for simultaneously positioning the pressure selecting means and the effective speed selecting element to determine the particular pressure and speed to be maintained.

11. A controller for an engine having speed governing apparatus comprising, in combination, means for maintaining some selected pressure in the engine intake, means for selecting the pressure to be maintained in said intake, means for controlling the speed governing apparatus to maintain a selected speed, comprising a plurality of speed selecting cams having different contours whereby each of said cams is effective to maintain a different schedule of engine speed with respect to the schedule of intake pressure, means for rendering one of said cams effective and for determining which cam shall be effective, and means for simultaneously positioning the pressure selecting means and said cams to select the intake pressure and engine speed.

12. A controller for an engine having speed governing apparatus comprising, in combination, means for maintaining some selected pressure in the engine intake, means for selecting the pressure to be maintained in said intake, means for controlling the speed governing apparatus to maintain a selected speed, comprising a plurality of pivotally mounted speed selecting cams having different contours whereby each of said cams is effective to maintain a different schedule of engine speed with respect to the schedule of intake pressure, means for pivotally moving said cams to render one of them effective and to determine which of them shall be effective, and means for simultaneously positioning the pressure selecting means and bodily moving said cams to select the desired intake pressure and engine speed.

13. A controller for an engine having speed governing apparatus comprising, in combination, means for maintaining some selected pressure in the engine intake, means for selecting the pressure to be maintained in said intake, means for controlling the speed governing apparatus to maintain a selected speed, means for selecting the engine speed to be maintained according to any one of a plurality of schedules having different relations to the pressure selection, means for determining the particular speed selecting schedule which shall be effective, means for controlling the ignition timing in coordinated relation with the pressure selection, and means for operating the last named means, the pressure selecting means and the speed selecting means simultaneously.

14. A controller for an engine having speed governing apparatus comprising, in combination, means for maintaining some selected pressure in the engine intake, means for selecting the pressure to be maintained in said intake, means for controlling the speed governing apparatus to maintain a selected speed, an element movable to control the ignition timing in coordinated relation with the intake pressure, means supported on said element for selecting the engine speed to be maintained in accordance with a schedule having a predetermined relation to the intake pressure, and means for positioning the pressure selecting means, the element for controlling the timing and the speed selecting means at the same time.

15. A controller for an engine having speed governing apparatus comprising, in combination, means for maintaining some selected pressure in the engine intake, means for selecting the pressure to be maintained in said intake, means for controlling the speed governing apparatus to maintain a selected speed, an element movable to control the ignition timing in coordinated relation with the intake pressure, means supported on said element for selecting the engine speed to be maintained according to any one of a plurality of schedules having different relations to the pressure selection, means for determining the particular speed selecting schedule which shall be effective, and means for concurrently positioning the pressure selecting means, the element for controlling the timing and the speed selecting means.

16. A controller for an engine having speed governing apparatus comprising, in combination, means for maintaining some selected pressure in the engine intake, means for selecting the pressure to be maintained in said intake, means for controlling the speed governing apparatus to maintain a selected speed, an element movable to control the ignition timing in coordinated relation with the intake pressure, a plurality of speed selecting members pivotally supported on said ignition controlling element for selecting the engine speed to be maintained according to one of a plurality of schedules having different relations to the pressure selection, means for moving said members pivotally to render one of said members effective and to determine which of said members shall be effective, and means for moving said members bodily when the ignition controlling element is moved in order to select the engine speed to be maintained.

17. A controller for an engine having speed governing apparatus comprising, in combination, means for maintaining some selected pressure in the engine intake, means for selecting the pressure to be maintained in said intake, means for controlling the speed governing apparatus to maintain a selected speed, an element movable to control the ignition timing in coordinated relation with the intake pressure, a plurality of speed selecting members pivotally supported on said ignition controlling element for selecting the engine speed to be maintained according to one of a plurality of schedules having different relations to the pressure selection, means for moving said members pivotally to render one of said members effective and to determine which of said members shall be effective, and means for moving the speed selecting elements bodily to select a speed to be maintained concurrently as the pressure selecting means and the ignition controlling element are moved to select an intake pressure and regulate the ignition timing.

18. A controller for an engine having speed governing apparatus comprising, in combination, means for maintaining some selected pressure in the engine intake, means for selecting the pressure to be maintained in said intake, means for controlling the speed governing apparatus to maintain a selected speed, an element movable to control the ignition timing in coordinated relation with the intake pressure, means supported on said element for selecting the engine speed to be maintained according to any one of a plurality of schedules having different relations to the pressure selection, means for determining the particular speed selecting schedule which shall be effective, means for concurrently positioning the pressure selecting means, the element for controlling the timing and the pressure selecting means, and means controlled by the introduction of an anti-detonant with the fuel supplied to the engine for limiting the pressure which can be obtained when the anti-detonant is not being introduced.

19. A controller for an engine having speed governing apparatus comprising, in combination, means for maintaining some selected pressure in the engine intake, means for selecting the pressure to be maintained in said intake, means for controlling the speed governing apparatus to maintain a selected speed, means for selecting the engine speed to be maintained according to any one of a plurality of schedules having different relations to the pressure selection, means for determining the particular speed selecting schedule which shall be effective, means for connecting the speed selecting means with the pressure selecting means so that said speed selecting means and pressure selecting means are operated simultaneously and the pressure selecting means, and means controlled by the introduction of an anti-detonant with the fuel supplied to the engine for limiting the pressure which can be obtained when the anti-detonant is not being introduced.

CLARENCE H. JORGENSEN.
WILLARD T. NICKEL.

References Cited in the file of this patent

UNITED STATES PATENTS

| Number | Name | Date |
|---|---|---|
| 2,115,485 | Dodson | Apr. 26, 1938 |
| 2,217,364 | Halford et al. | Oct. 8, 1940 |
| 2,396,618 | Stieglitz | Mar. 12, 1946 |

FOREIGN PATENTS

| Number | Country | Date |
|---|---|---|
| 119,513 | Australia | Feb. 15, 1945 |